(12) United States Patent
Efraim et al.

(10) Patent No.: US 11,336,508 B2
(45) Date of Patent: May 17, 2022

(54) TRANSPARENT FAILOVER IN A NETWORK INTERFACE CONTROLLER

(71) Applicant: Mellanox Technologies, Ltd., Yokneam (IL)

(72) Inventors: Ron Efraim, Zur Hadasa (IL); Dror Goldenberg, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/024,864

(22) Filed: Jul. 1, 2018

(65) Prior Publication Data
US 2020/0007383 A1    Jan. 2, 2020

(51) Int. Cl.
*H04L 41/0659* (2022.01)
*H04L 49/00* (2022.01)
*H04L 41/0668* (2022.01)

(52) U.S. Cl.
CPC ...... *H04L 41/0659* (2013.01); *H04L 41/0668* (2013.01); *H04L 49/30* (2013.01)

(58) Field of Classification Search
CPC .. H04L 49/30; H04L 41/0659; H04L 41/0668
See application file for complete search history.

(56) References Cited

U.S. PATENT DOCUMENTS

| | | | |
|---|---|---|---|
| 6,763,479 B1 | 7/2004 | Hebert | |
| 6,834,038 B1 | 12/2004 | Zelig et al. | |
| 6,917,986 B2 | 7/2005 | Mor et al. | |
| 7,565,568 B1* | 7/2009 | Kumar | G06F 11/201 |
| | | | 714/11 |
| 7,903,543 B2 | 3/2011 | Kashyap | |
| 9,172,600 B1 | 10/2015 | Vora | |
| 10,476,698 B2* | 11/2019 | Chikkamath | H04L 12/4633 |
| 10,581,758 B2* | 3/2020 | Thayalan | H04L 45/245 |
| 2002/0003780 A1* | 1/2002 | Braun | H04L 45/28 |
| | | | 370/254 |
| 2006/0002292 A1* | 1/2006 | Chang | H04L 45/22 |
| | | | 370/225 |
| 2006/0206602 A1 | 9/2006 | Hunter et al. | |
| 2006/0274647 A1 | 12/2006 | Wang et al. | |
| 2013/0329547 A1 | 12/2013 | Takase et al. | |
| 2014/0056300 A1* | 2/2014 | Zhao | H04L 45/42 |
| | | | 370/392 |
| 2014/0317437 A1* | 10/2014 | LeFevre | G06F 11/2033 |
| | | | 714/4.11 |

(Continued)

*Primary Examiner* — Redentor Pasia
(74) *Attorney, Agent, or Firm* — Kligler & Associates Patent Attorneys Ltd (57) ABSTRACT

A network interface apparatus includes a host interface for connection to a host processor and a network interface, which includes multiple distinct physical ports. Processing circuitry associates each of a plurality of virtual entities running on the host processor with a respective one of the physical ports, so that while both of the first and second physical ports are operational, the processing circuitry transmits data packets on behalf of first and second virtual entities, using assigned upper-layer addresses, through associated first and second physical ports. In response to an indication that the first physical port has ceased to operate, the processing circuitry transmits the data packets on behalf of the first virtual entity through the second physical port without changing the upper-layer addresses.

24 Claims, 3 Drawing Sheets

(56) References Cited

U.S. PATENT DOCUMENTS

| | | | |
|---|---|---|---|
| 2015/0271244 A1* | 9/2015 | Bloch | H04L 69/40 709/217 |
| 2015/0370668 A1* | 12/2015 | Nazari | G06F 11/2094 714/6.3 |
| 2017/0054630 A1* | 2/2017 | Liang | H04L 45/64 |
| 2017/0289065 A1* | 10/2017 | Zhu | H04L 12/4633 |
| 2019/0097919 A1* | 3/2019 | Santos | H04L 45/28 |
| 2019/0253381 A1* | 8/2019 | Ji | H04L 45/22 |
| 2019/0258505 A1* | 8/2019 | Gao | H04L 12/4633 |
| 2020/0186598 A1* | 6/2020 | Park | H04L 49/70 |
| 2020/0304413 A1* | 9/2020 | MacCarthaigh | H04L 47/2441 |
| 2020/0314692 A1* | 10/2020 | Mittal | H04W 48/18 |

* cited by examiner

TRANSPARENT FAILOVER IN A NETWORK INTERFACE CONTROLLER

FIELD OF THE INVENTION

The present invention relates generally to computer networks, and particularly to devices and methods for interfacing between host computers and a network.

BACKGROUND

A network interface controller (NIC) is a device that manages and transfers communications between a host computer (referred to alternatively simply as a "host") and a network, such as a local area network or switch fabric. The NIC directs packets from the network to their destination in the computer, for example by placing the packets in a buffer of a destination application in the computer memory, and directs outgoing packets, for example sending them either to the network or to a loopback port. In InfiniBand® networks, the NIC is commonly referred to as a host channel adapter (HCA).

When a host computer supports multiple virtual machines (VMs), different approaches may be taken by the NIC in handling incoming and outgoing packets. In one approach, all packets are directed to a virtual machine monitor (VMM, also known as a hypervisor) running on the host, and the VMM directs the packets to the specific destination virtual machine. More recently, however, NICs have been developed with the capability of exposing multiple virtual NICs (vNICs) to software running on the host. In a model that is known as single-root I/O virtualization (SR-IOV), each VM interacts with its own corresponding vNIC, which appears to the VM to be a dedicated hardware NIC. The vNIC links the VM to other machines (virtual and/or physical) on a network, possibly including other virtual machines running on the same host. In this regard, the NIC acts as a virtual switch, connecting each of the virtual machines to a network while allowing multiple vNICs to share the same physical network port.

U.S. Patent Application Publication 2015/0271244, whose disclosure is incorporated herein by reference, describes enhancements to this basic virtual switching capability of the NIC to extend to switching between the physical network ports of the NIC. The embodiments described in this publication add a link between two (or more) virtual switches that are exposed by the NIC. As a result, packets received from the network via one of the physical ports of the NIC can be looped back, via the receive and send pipes of the NIC, to the network via another of the ports. By the same token, any of the vNICs exposed by the NIC can access the network through any of the physical ports, and not only the port to which their own corresponding virtual switch is linked. These virtual links and switching capabilities are implemented without the need for actual switching hardware between the physical ports of the NIC.

Failover mechanisms are commonly used in computer networks to ensure high availability of network communications: When a failure is detected in a link that has been carrying communication traffic, the traffic is automatically switched over to a redundant link.

A scheme of this sort is presented, for example, in U.S. Patent Application Publication 2013/0329547, which describes a communication device including a plurality of physical ports. The communication device holds information for associating each of at least one logical port and at least two physical ports. The communication device is configured to: identify, when any one of the plurality of physical ports receives data including user data, one of the at least one logical port as an output destination of the data based on destination information included in the received data; select, based on the data, one of the at least two physical ports associated with the identified logical port as an destination of the data; generate coupling check data relating to one of the plurality of physical ports; transmit the coupling check data from the one of the plurality of physical ports; and transmit data including the user data from the physical port selected by a first processing unit as the output destination. The states of each of the logical ports are changed depending on an occurrence of and a recovery from a failure on the physical port As another example, U.S. Patent Application Publication 2015/0370668 describes failover in response to failure of a port. A failure at a first port of a controller node is detected, where the first port is initially assigned a first port identifier and is associated with a logical path through a communications fabric between the first port and a port at a host device. In response to detecting the failure, the first port identifier is assigned to a second port to cause the logical path to be associated with the second port.

SUMMARY

Embodiments of the present invention that are described hereinbelow provide network interface devices and methods for failover between the network ports of such devices.

There is therefore provided, in accordance with an embodiment of the invention, a network interface apparatus, including a host interface for connection to a host processor, which is configured to run multiple virtual entities, including at least first and second virtual entities, which are assigned different, respective upper-layer addresses for communication over a network. A network interface includes multiple distinct physical ports configured for connection to the network, including at least first and second physical ports. Processing circuitry is coupled between the host interface and the network interface and is configured to associate each of the virtual entities with a respective one of the physical ports, including associating the first and second virtual entities respectively with the first and second physical ports, so that while both of the first and second physical ports are operational, the processing circuitry transmits data packets on behalf of the first and second virtual entities, using the assigned upper-layer addresses, through the associated first and second physical ports. The processing circuitry is further configured, in response to an indication that the first physical port has ceased to operate, to transmit the data packets on behalf of the first virtual entity through the second physical port without changing the upper-layer addresses.

In some embodiments, the processing circuitry is configured to implement a virtual switching function, which includes first and second virtual switches, which are associated respectively with the first and second physical ports, and which is configured, in response to the indication that the first physical port has ceased to operate, to transmit the data packets on behalf of the first virtual entity through the second physical port via a virtual link between the first and second virtual switches.

The upper-layer addresses may include network-layer identifiers and/or transport-layer identifiers.

Typically, the processing circuitry is also configured, when the first physical port is operational and the second physical port has ceased to operate, to transmit the data packets on behalf of the second virtual entity through the first physical port without changing the upper-layer addresses.

In a disclosed embodiment, the processing circuitry is configured, while both of the first and second physical ports are operational, to receive and deliver incoming data packets to the first and second virtual entities, using the assigned upper-layer addresses, through the associated first and second physical ports, and following the indication that the first physical port has ceased to operate, to receive and deliver the incoming data packets to the first virtual entity through the second physical port using the same upper-layer addresses.

Additionally or alternatively, the first and second physical ports have respective first and second link-layer identifiers, which are assigned by a subnet manager on the network when both of the first and second physical ports are operational, and the first link-layer identifier is reassigned to the second physical port when the first physical port ceases to operate.

In some embodiments, the packet processing circuitry includes a send pipe, which is configured to construct the data packets on behalf of the both the first and second virtual entities, and the send pipe includes port selection logic, which is configured to select the physical ports through which the data packets are to be transmitted depending upon which of the first and second physical ports are operational. In a disclosed embodiment, the port selection logic is configured, in response to the indication that the first physical port has ceased to operate, to transfer transmission of the data packets on behalf of the first virtual entity from the first physical port to the second physical port without notification to the host processor.

There is also provided, in accordance with an embodiment of the invention, a method for communication, which includes configuring a network interface controller (NIC), which is coupled to a host processor running multiple virtual entities, including at least first and second virtual entities, which are assigned different, respective upper-layer addresses for communication over a network, to transmit and receive data packets over the network via multiple distinct physical ports of the NIC, including at least first and second physical ports. Each of the virtual entities is associated with a respective one of the physical ports, including associating the first and second virtual entities respectively with the first and second physical ports, so that while both of the first and second physical ports are operational, the NIC transmits data packets on behalf of the first and second virtual entities, using the assigned upper-layer addresses, through the associated first and second physical ports. In response to an indication that the first physical port has ceased to operate, the data packets are transmitted by the NIC on behalf of the first virtual entity through the second physical port without changing the upper-layer addresses.

The present invention will be more fully understood from the following detailed description of the embodiments thereof, taken together with the drawings in which:

DETAILED DESCRIPTION OF EMBODIMENTS

Overview

Failover mechanism that are known in the art tend to consume substantial hardware and software resources. On the hardware side, an active port may be bonded with a standby port, which is inactive as long as the active port is operational and takes over when the active port goes down. In this scheme, high availability is assured, but the hardware resources associated with the standby port are largely wasted, as the standby port is idle most of the time.

Other failover schemes may be less wasteful of hardware resources, but require awareness of and participation in the failover process at the software level. For example, in some schemes, it is necessary to provision additional resources, such as upper-layer addresses and transport contexts, for use by application and/or communication software in case of a link failure to support transfer of packet traffic to an alternative port. (The term upper-layer, as used in the present description and in the claims, refers to layers three and higher in the well-known Open Systems Interconnection [OSI] model, i.e., layers above the data-link layer. Thus, the upper layers include the network layer and transport layer; and upper-layer addresses can include the Internet Protocol [IP] address in IP networks, for example, as well as the network-layer global identifier [GID] and transport-layer queue pair number [QPN] in InfiniBand networks.)

In contrast to these existing failover mechanisms, embodiments of the present invention that are described herein provide failover schemes for use in a NIC that are economical in their use of both hardware and software resources, and can be implemented in a manner that is transparent to software processes running on the host processor. In the disclosed embodiments, the NIC has multiple distinct physical ports connected to a network, all or which can be active and serve client processes on the host processor concurrently. When the NIC discovers that one of its ports has ceased to operate, due to either physical or logical failure, the NIC automatically transfers packet traffic from this port to another port, without changing the upper-layer addresses used in the packets. Available hardware resources are thus fully utilized at all times, and there is no need to provision additional software resources (such as network-layer addresses or transport-layer queue pairs) for use in case of failure or even to notify the host processor of the transfer of packet traffic between ports.

These failover schemes are useful particularly in the context of a NIC that exposes multiple vNICs, which serve respective virtual entities running on the host processor that is connected to the host interface of the NIC, such as the NIC described in the above-mentioned U.S. Patent Application Publication 2015/0271244. (In the description that follows, the virtual entities in question are assumed to be virtual machines, but the principles of the present invention are similarly applicable to other types of virtual entities that are known in the art, such as containers.) In such a NIC, each vNIC is normally linked by default to one of the physical ports via an internal switching function, referred to as a virtual switch or "eSwitch," and each of the physical ports is linked to a corresponding eSwitch. In addition to these default connections, the internal switching function of the NIC can create one or more internal virtual links between the physical ports. When such a virtual link is active, it enables any of the vNICs exposed by the NIC to access the network through any of the physical ports, and not only the port to which its own corresponding eSwitch is linked. These virtual links and switching capabilities are implemented without the need for actual switching hardware between the physical ports of the NIC.

In the embodiments described below, the virtual machines are assigned different, respective upper-layer addresses, such as network-layer and/or transport-layer identifiers. Processing circuitry in the NIC associates each of the virtual machines with one of the physical ports and transmits data packets on behalf of the virtual machines, using the assigned upper-layer addresses, through the physical ports with which they are respectively associated as long as these ports are operational. Under these circumstances, the internal virtual links are not used in handling outgoing packets (although they may be used, for example, in loopback functions). When the processing circuitry receives an indication that any one of the physical ports has ceased to operate, however, it activates the virtual link in order to transmit the data packets on behalf of the virtual machines that were associated with the failed physical port through another physical port that is still operational.

This failover via the internal virtual link takes place without changing the upper-layer addresses. Management functions that are present in packet networks that are known in the art will detect that transmission of packets with a given upper-layer address have migrated to a different physical port and will automatically remap the link-layer addressing in the network accordingly. For example, in an InfiniBand network, the subnet manager will detect that packets having a given GID (which is assigned to a certain virtual machine) are being transmitted through a different physical port and will reassign the link-layer local identifier (LID) accordingly. Thus, incoming packets destined to the upper-layer address of this virtual machine will be forwarded by the network to the newly-assigned physical port and will be delivered by the NIC, via the internal virtual link, to the virtual machine.

When the failed physical port returns to normal operation, the processing circuitry in the NIC effectively shuts down the internal virtual link, and thus automatically reconnects each virtual machine (and the corresponding vNIC) to the physical port with which it was previously associated. If another physical port ceases to operate, the same sort of failover protection can be applied.

For the sake of concreteness and clarity, the embodiments described herein relate specifically at certain points to aspects of the InfiniBand protocols and assume that the physical ports of the NIC connect to an InfiniBand network, with addressing managed by a subnet manager. Alternatively, the principles of the present invention may be applied, mutatis mutandis, to other sorts of packet networks, such as networks operating in accordance with the Ethernet and IP families of standards. In this latter case, the link-layer (MAC) addresses of the ports are fixed, and when failover occurs, access to the upper-layer addresses is remapped using protocols that are known in the art, such as the Address Resolution Protocol (ARP) and Spanning Tree Protocol (STP).

System Description

Figure 1:
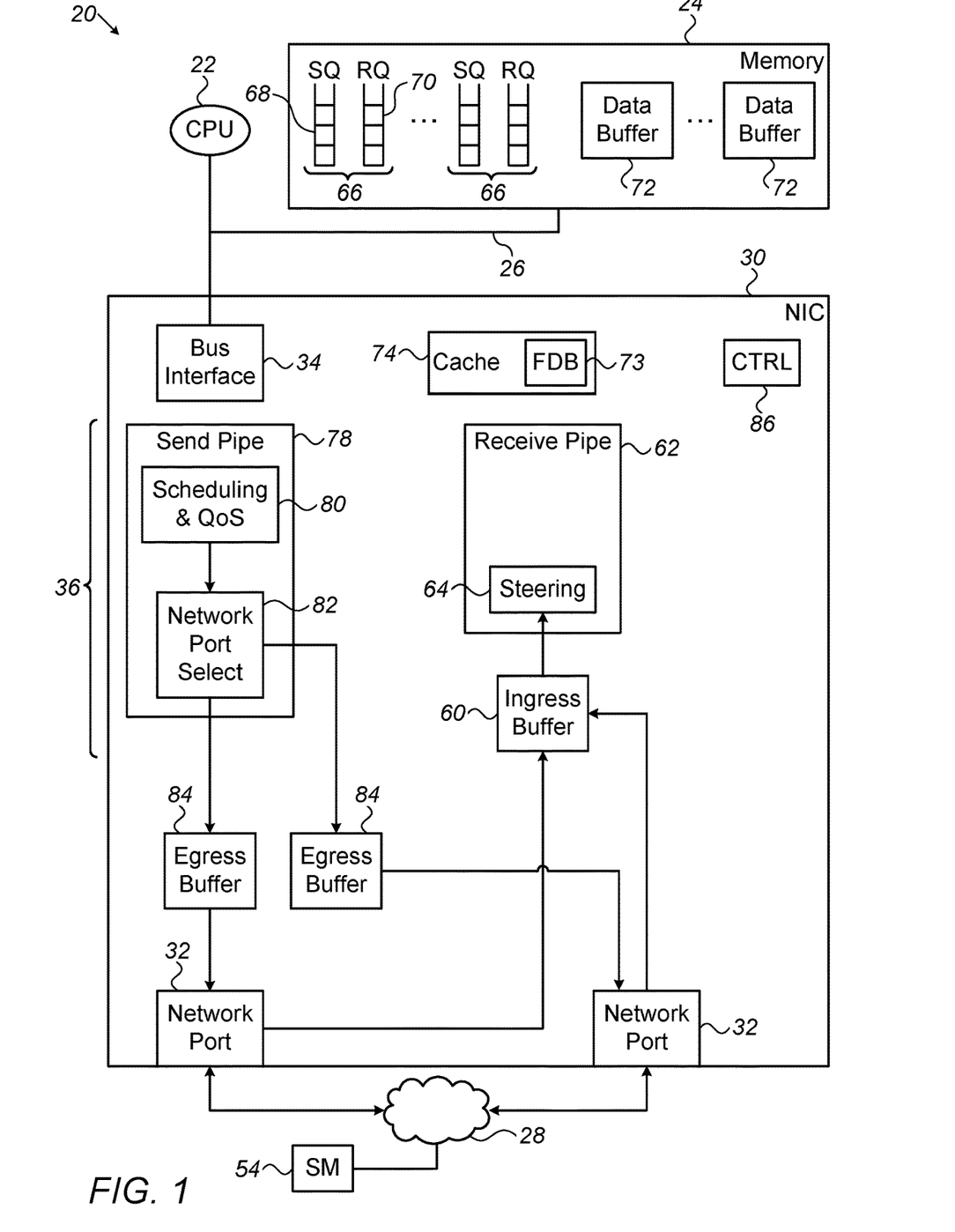
FIG. 1 is a block diagram that schematically illustrates a computer with a NIC, in accordance with an embodiment of the present invention.
Figure 2:
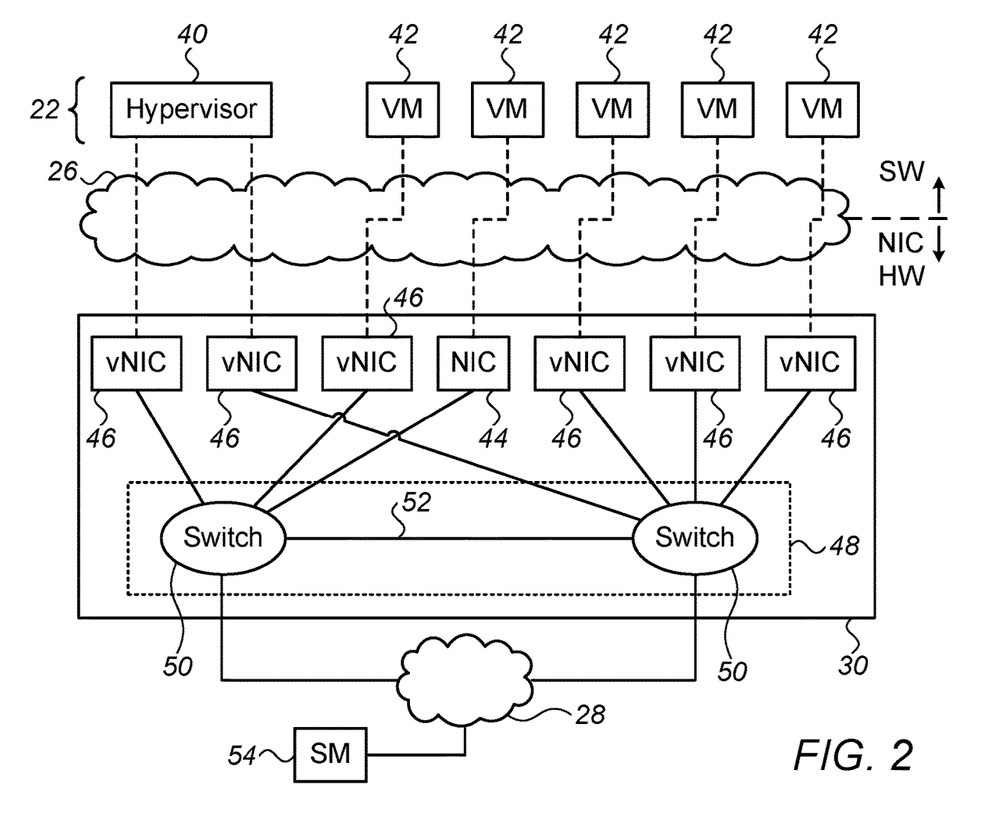
FIG. 2 is a block diagram that schematically shows logical components of a computer with a NIC, in accordance with an embodiment of the present invention.

Reference is now made to FIGS. 1 and 2, which schematically illustrate a computer 20 with a NIC 30, in accordance with an embodiment of the present invention. FIG. 1 shows physical components of the computer (and particularly of the NIC), while FIG. 2 shows logical entities that are supported by these physical components. For the sake of clarity, the physical components of NIC 30 are shown in FIG. 1 as multiple, separate functional blocks. In practice, however, these components are typically (although not necessarily) implemented as hardware and firmware components within a single integrated circuit chip or chipset, possibly together with a central processing unit (CPU) 22 of the computer, as well.

As shown in FIG. 1, computer 20 comprises a host processor, comprising at least one CPU 22 (which may comprise multiple processing cores), and a system memory 24, typically comprising random-access memory (RAM). NIC 30 connects computer 20 to a network 28, which is assumed in this embodiment to be an InfiniBand switch fabric. NIC 30 comprises a network interface in the form of two (or more) distinct physical network ports 32, configured for connection to network 28. NIC 30 is connected to CPU 22 and memory 24 via a peripheral component bus 26, such as a PCI Express bus, through a bus interface 34, which serves as the host interface of the NIC. Processing circuitry 36 in NIC 30 is connected between network ports 32 and bus interface 34 and handles both incoming packets received from network 28 and outgoing packets for transmission to network 28, as described in greater detail hereinbelow.

Processing circuitry 36 typically comprises hardware logic circuits, which may be programmable or hard-wired and are configured to carry out the functions described herein, as well as other packet processing functions that are known in the art. Although FIG. 1 shows one possible implementation of circuitry 36, other implementations will be apparent to those skilled in the art after reading the present description and are considered to be within the scope of the present invention. Furthermore, although the elements of NIC 30 are shown in FIG. 1 as separate functional components, in practice these components can be implemented together within a single chip or chip set.

As shown in FIG. 2, CPU 22 in this example runs software (indicated by the legend "SW" at the right side of the figure) that includes a hypervisor 40 and multiple virtual machines (VMs) 42, as are known in the art. Processing circuitry 36 exposes a physical NIC function 44 and multiple vNICs 46 to the software on CPU 22. Thus, each VM 42 interacts with a corresponding vNIC 46 (or possibly with NIC function 44). Processing circuitry 36 also implements a virtual switching function 48, which includes two virtual switches 50, referred to eSwitches in SR-IOV parlance, each associated with a respective physical port 32. Switches 50 each transfer packets between a group of vNICs 46 and the corresponding port 32 and among the vNICs connected to the switch.

In addition, processing circuitry 36 implements a virtual link 52 for transfer of packets between switches 50. When NIC 30 receives an indication that one of physical ports 32 has ceased to operate, virtual switching function 48 activates virtual link 52 to transfer packet traffic from the vNICs 46 that were previously connected to the failed port via virtual switches 50 and link 52 to the other, operational port, and from the operational port to these vNICs. Thus, in the pictured scenario, when one of ports 32 fails, all traffic will be transmitted and received through the other port. The available bandwidth may thus be reduced, but all of VMs 42 will still be able to communicate over network 28.

An InfiniBand subnet manager 54 manages addressing and forwarding functions on network 28, as is known in the art. Subnet manager 54 assigns local identifiers (LIDs) to each port 32 that is connected to the network and develops a routing table, which associates the global identifiers (GIDs) of entities that transmit and receive packets over the network with the assigned LIDs. Thus, in the present embodiment, subnet manager 54 will associate the GID of each VM 42 with the LID of port 32 to which the corresponding vNIC 46 is logically connected by the corresponding virtual switch 50. Subnet manager 54 may also signal the status of ports 32 to NIC 30 and thus indicate that one of ports 32 has failed (due to either a physical or logical malfunction, for example).

When such a failure occurs, and failover via virtual link 52 is activated, subnet manager 54 will detect that certain GIDs that were previously mapped to the failed port are now appearing in packets transmitted through the other port, and will update the LID mapping accordingly. This update is part of the normal operation of the InfiniBand subnet manager and does not require any active involvement (or even awareness of the update) by CPU 22 or NIC 30.

Returning now to FIG. 1, client processes running on CPU 22, such as virtual machines 42 and applications running on the virtual machines, communicate with the transport layer of network 28 by manipulating a transport service instance, known as a "queue pair" (QP) 66, which is made up of a send queue (SQ) 68 and a receive queue (RQ) 70. To send and receive messages over the network using NIC 30, a client process submits descriptors, known as work items or work queue elements (WQEs), to queues 68 and 70 of the appropriate QP 66 for execution by the NIC. Queues 68 and 70 are typically held in memory 24. NIC 30 reads and executes the WQEs from queues 68 and 70 and accordingly gathers data from data buffers 72 in specified locations in memory 24 and transmits the data in outgoing packets over network 28, as well as writing data from incoming packets to the memory.

Ports 32 pass incoming packets that they receive from network 28 to an ingress buffer 60, for processing in a receive pipe 62. Steering logic 64 associated with the receive pipe decides, for each incoming packet, where to deliver the payload of the packet via bus interface 34 and memory 24 (or possibly to forward the packet back to network 28 via the other port 32). In order to make this decision, steering logic 64 extracts a destination identifier from the packet, typically based on one or more packet header fields, such as the link-layer and/or network-layer address (physical or virtualized), and/or a transport-layer value, such as the QP number. Steering logic 64 looks up the destination identifier in a forwarding database (FDB) 73, which may be held at least in part in a cache 74 in NIC 30, and/or held in system memory 24. The entries in FDB 73 indicate, for each destination identifier, whether the packet is to be delivered to a process running on CPU 22, and if so, which VM 42 and which QP 66 are to receive the data. A learning function running either on CPU 22 or on a suitable processor in NIC 30 (such as a programmable controller 86) may operate to populate FDB 73 with forwarding instructions for new destination identifiers as they are received in NIC 30.

Packet transmission requests by processes running on CPU 22 are processed by a send pipe 78 in NIC 30. As explained earlier, to send data over network 28, client processes place appropriate WQEs in respective send queues 68 and then "ring the doorbell" of send pipe 78 via bus interface 34 to request service. Scheduling and quality of service (QoS) logic 80 associated with send pipe 78 arbitrates among the client requests. (Steering logic 64 and elements of send pipe 78 implement the logical functionality of switches 50, as shown in FIG. 2.) To service a given WQE, send pipe 78 constructs the appropriate header for an outgoing packet or packets, reads the data indicated by the WQE from buffer 72, and places the data in the packet payload. Typically, each packet is accompanied by metadata derived from QP 66 indicating the port 32 through which the packet should be transmitted.

Based on these metadata and the state of ports 32, port selection logic 82 chooses the physical port through which the packets are to be transmitted and passes the packets to corresponding egress buffers 84. For these outgoing packets, port selection logic 82 implements virtual switching function 48. Thus, when both of ports 32 are operational, port selection logic 82 will transmit each packet to the port with which the originating VM 42 is associated, according to the metadata received with the packet. When NIC 30 receives an indication, such as a signal from subnet manager 54 or an internal indication, that one of ports 32 has ceased to operate, port selection logic 82 will override the port selection metadata and will automatically transfer transmission of all outgoing packets to the other port. (An exception to this override may occur in the case of packets associated with certain control protocols, which require transmission through a specific port, in which case such packets will simply be delayed or dropped when the port is down.) Port selection logic 82 performs these functions without requiring any notification to or involvement by CPU 22.

Method of Operation

Figure 3:
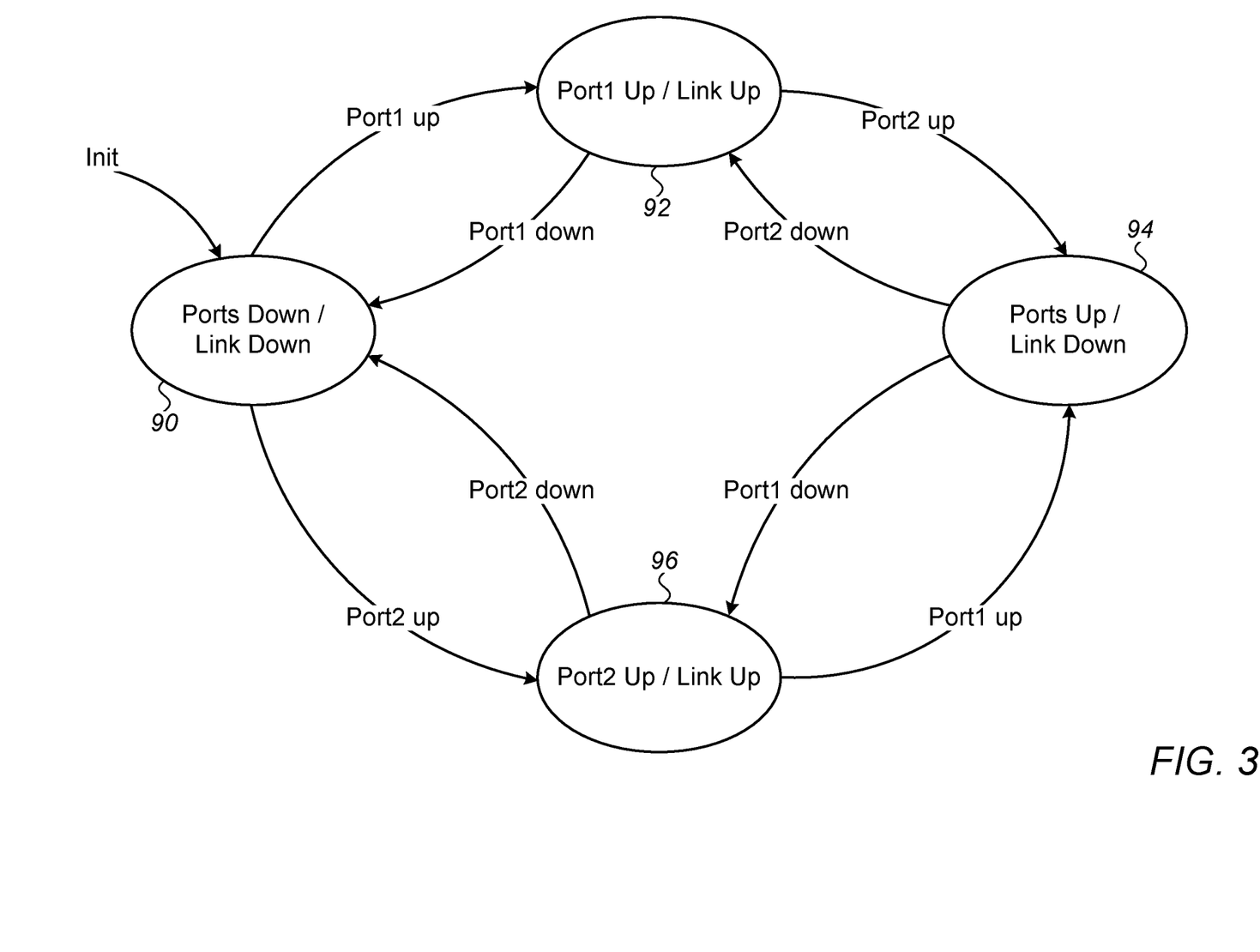
FIG. 3 is a state diagram that schematically illustrates a method for handling failover among the ports of a NIC, in accordance with an embodiment of the invention.

FIG. 3 is a state diagram that schematically illustrates a method for handling failure among ports 32 of NIC 30, in accordance with an embodiment of the invention. Upon initial power-up, NIC 30 is in a default non-operational state 90, in which ports 32 are down (non-operational) and link 52 is down, as well. NIC 30 verifies that one of ports 32 (arbitrarily labeled "Port1") is operational (up), and if so transfers to a Port1 operating state 92. In this mode, link 52 is activated, so that all traffic to and from network 28 is carried through Port1. As noted earlier, a given port 32 can be down for physical reasons, such as an absent or broken cable or a non-operational peer device, or logical reasons, for example when the port has not yet been enabled by subnet manager 54.

NIC 30 next verifies that the second port 32 (Port2) is operational, and if so transfers to a normal operating state 94. In this state, both of ports 32 are able to transmit and receive traffic to and from network, and link 52 is therefore not used for purposes of failover. (Link 52 may still be used for other purposes, such as loop-back and daisy chaining through NIC 30.)

If Port1 subsequently becomes non-operational, NIC 30 will transfer to a Port2 operating state 96, in which link 52 is activated, and all traffic is carried through Port2. Similarly, if Port2 becomes non-operational, NIC 30 will return to Port1 operating state 92. In other words, link 52 is active whenever a single port 32 is operational and inactive otherwise. (In the implementation shown in FIG. 1, the active or inactive state of link 52 is determined by the logical configuration of port selection logic 82.) If both ports fail, NIC 30 returns to non-operational state 90.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface apparatus, comprising:
a host interface for connection to a host processor, which is configured to run multiple virtual entities, including at least first and second virtual entities, which are assigned different, respective upper-layer addresses for communication over a network;
a network interface, which comprises multiple distinct physical ports configured for connection to the network, including at least first and second physical ports; and
processing circuitry, which is coupled between the host interface and the network interface and is configured to associate each of the virtual entities with a respective one of the physical ports, including associating the first and second virtual entities respectively with the first and second physical ports, so that while both of the first and second physical ports are operational, the processing circuitry transmits data packets on behalf of the first and second virtual entities, through the associated first and second physical ports,
wherein the processing circuitry is further configured, in response to an indication that the first physical port has ceased to operate, to cause an automatic remap of link-layer addressing in the network, by activating an internal virtual link between the first and second ports, and to transmit the data packets on behalf of the first virtual entity through the second physical port via the activated internal virtual link without changing the upper-layer addresses,
wherein the processing circuitry comprises for each of the multiple virtual entities, a respective virtual NIC, which constructs all outgoing packets for the respective virtual entity, regardless of whether the associated physical port is operative,
wherein while both of the first and second physical ports are operational, the outgoing packets constructed by the respective virtual NIC are transmitted through the port associated with the respective virtual entity, and
wherein in response to the indication that the first physical port has ceased to operate, outgoing packets constructed by the respective virtual NIC on behalf of the first virtual entity are forwarded through the second physical port without changing the upper-layer addresses.

2. The apparatus according to claim 1, wherein the processing circuitry is configured to implement a virtual switching function, which includes first and second virtual switches, which are associated respectively with the first and second physical ports, and which is configured, in response to the indication that the first physical port has ceased to operate, to transmit the data packets on behalf of the first virtual entity through the second physical port via the virtual link.

3. The apparatus according to claim 1, wherein the upper-layer addresses comprise network-layer identifiers.

4. The apparatus according to claim 1, wherein the upper-layer addresses comprise transport-layer identifiers.

5. The apparatus according to claim 1, wherein the processing circuitry is also configured, when the first physical port is operational and the second physical port has ceased to operate, to transmit the data packets on behalf of the second virtual entity through the first physical port without changing the upper-layer addresses.

6. The apparatus according to claim 1, wherein the processing circuitry is configured, while both of the first and second physical ports are operational, to receive and deliver incoming data packets to the first and second virtual entities, using the assigned upper-layer addresses, through the associated first and second physical ports, and following the indication that the first physical port has ceased to operate, to receive and deliver the incoming data packets to the first virtual entity through the second physical port using the same upper-layer addresses.

7. The apparatus according to claim 1, wherein the first and second physical ports have respective first and second link-layer identifiers, which are assigned by a subnet manager on the network when both of the first and second physical ports are operational, and wherein the first link-layer identifier is reassigned to the second physical port when the first physical port ceases to operate.

8. The apparatus according to claim 1, wherein the packet processing circuitry comprises a send pipe, which is configured to construct the data packets on behalf of the both the first and second virtual entities, and wherein the send pipe comprises port selection logic, which is configured to select the physical ports through which the data packets are to be transmitted depending upon which of the first and second physical ports are operational.

9. The apparatus according to claim 8, wherein the port selection logic is configured, in response to the indication that the first physical port has ceased to operate, to transfer transmission of the data packets on behalf of the first virtual entity from the first physical port to the second physical port without notification to the host processor.

10. A method for communication, comprising:
configuring a network interface controller (NIC), which is coupled to a host processor running multiple virtual entities, including at least first and second virtual entities, which are assigned different, respective upper-layer addresses for communication over a network, to transmit and receive data packets over the network via multiple distinct physical ports of the NIC, including at least first and second physical ports;
associating each of the virtual entities with a respective one of the physical ports, including associating the first and second virtual entities respectively with the first and second physical ports, so that while both of the first and second physical ports are operational, the NIC transmits data packets on behalf of the first and second virtual entities, through the associated first and second physical ports; and
in response to an indication that the first physical port has ceased to operate, causing an automatic remap of link-layer addressing in the network, by activating an internal virtual link between the first and second ports, and transmitting the data packets by the NIC on behalf of the first virtual entity through the second physical port via the activated internal virtual link without changing the upper-layer addresses,
wherein the NIC comprises for each of the multiple virtual entities, a respective virtual NIC, which constructs all outgoing packets for the respective virtual entity, regardless of whether the associated physical port is operative,
wherein while both of the first and second physical ports are operational, the outgoing packets constructed by the respective virtual NIC are transmitted through the port associated with the respective virtual entity, and
wherein in response to the indication that the first physical port has ceased to operate, outgoing packets constructed by the respective virtual NIC on behalf of the first virtual entity are forwarded through the second physical port without changing the upper-layer addresses.

11. The method according to claim 10, wherein transmitting the data packets comprises implementing in the NIC a virtual switching function, which includes first and second virtual switches, which are associated respectively with the first and second physical ports, and in response to the indication that the first physical port has ceased to operate, transmitting the data packets on behalf of the first virtual entity through the second physical port via a virtual link between the first and second virtual switches.

12. The method according to claim 10, wherein the upper-layer addresses comprise network-layer identifiers.

13. The method according to claim 10, wherein the upper-layer addresses comprise transport-layer identifiers.

14. The method according to claim 10, and comprising, when the first physical port is operational and the second physical port has ceased to operate, transmitting the data packets by the NIC on behalf of the second virtual entity through the first physical port without changing the upper-layer addresses.

15. The method according to claim 10, and comprising, while both of the first and second physical ports are operational, receiving and delivering incoming data packets by the NIC to the first and second virtual entities, using the assigned upper- layer addresses, through the associated first and second physical ports, and following the indication that the first physical port has ceased to operate, receiving and delivering the incoming data packets by the NIC to the first virtual entity through the second physical port using the same upper-layer addresses.

16. The method according to claim 10, wherein the first and second physical ports have respective first and second link-layer identifiers, which are assigned by a subnet manager on the network when both of the first and second physical ports are operational, and wherein the first link-layer identifier is reassigned to the second physical port when the first physical port ceases to operate.

17. The method according to claim 10, and comprising constructing the data packets on behalf of the both the first and second virtual entities in a send pipe of the NIC, which comprises port selection logic, which is configured to select the physical ports through which the data packets are to be transmitted depending upon which of the first and second physical ports are operational.

18. The method according to claim 17, and comprising, in response to the indication that the first physical port has ceased to operate, transferring by the port selection logic transmission of the data packets on behalf of the first virtual entity from the first physical port to the second physical port without notification to the host processor.

19. The apparatus according to claim 1, wherein the processing circuitry is configured to forward packets of each given virtual entity to the network, only through the physical port associated with the given virtual entity, when the associated physical port is operative.

20. The apparatus according to claim 1, wherein the processing circuitry, is further configured to construct packet headers for the at least first and second virtual entities, using for each constructed packet header, the respective upper-layer address of the virtual entity for which the packet header is constructed.

21. The apparatus according to claim 1, wherein the processing circuitry, is further configured to shut down the internal virtual link, in response to an indication that the first physical port has returned to operate.

22. A network interface apparatus, comprising:
a host interface for connection to a host processor, which is configured to run multiple virtual entities, including at least first and second virtual entities, which are assigned different, respective upper-layer addresses for communication over a network;
a network interface, which comprises multiple distinct physical ports configured for connection to the network, including at least first and second physical ports; and
processing circuitry, which is coupled between the host interface and the network interface and is configured to associate each of the virtual entities with a respective one of the physical ports, including associating the first and second virtual entities respectively with the first and second physical ports, so that while both of the first and second physical ports are operational, the processing circuitry transmits data packets on behalf of the first and second virtual entities, through the associated first and second physical ports,
wherein the processing circuitry is further configured, in response to an indication that the first physical port has ceased to operate, to cause an automatic remap of link-layer addressing in the network, by activating an internal virtual link between the first and second ports, and to transmit the data packets on behalf of the first virtual entity through the second physical port via the activated internal virtual link without changing the upper-layer addresses,
wherein when the internal virtual link is inactive, the processing circuitry does not transmit data packets on behalf of the first virtual entity through the second physical port via the internal virtual link, but uses the internal virtual link for loop-back and daisy chaining.

23. A network interface apparatus, comprising:
a host interface for connection to a host processor, which is configured to run multiple virtual entities, including at least first and second virtual entities, which are assigned different, respective upper-layer addresses for communication over a network;
a network interface, which comprises multiple distinct physical ports configured for connection to the network, including at least first and second physical ports; and
processing circuitry, which is coupled between the host interface and the network interface and is configured to associate each of the virtual entities with a respective one of the physical ports, including associating the first and second virtual entities respectively with the first and second physical ports, so that while both of the first and second physical ports are operational, the processing circuitry transmits data packets on behalf of the first and second virtual entities, through the associated first and second physical ports,
wherein the processing circuitry is further configured, in response to an indication that the first physical port has ceased to operate, to cause an automatic remap of link-layer addressing in the network, by activating an internal virtual link between the first and second ports, and to transmit the data packets on behalf of the first virtual entity through the second physical port via the activated internal virtual link without changing the upper-layer addresses,
wherein the processing circuitry is configured to manage four states including:

a) a port1-up state in which the first port is operative;
b) a port2-up state in which the second port is operative;
c) a both-ports-up state; and
d) a both-ports-down state, wherein in the port1-up and the port2-up states the internal virtual link is active and in the both-ports-up state the internal virtual link is inactive.

24. The apparatus according to claim 23, wherein when in the port1-up state it is determined that second port became operative, the processing circuitry moves to the both-ports-up state and deactivates the internal virtual link.

* * * * *